May 6, 1924.
E. C. ELLWOOD
1,492,971
SEED DRILL
Filed Oct. 14, 1922
3 Sheets-Sheet 1
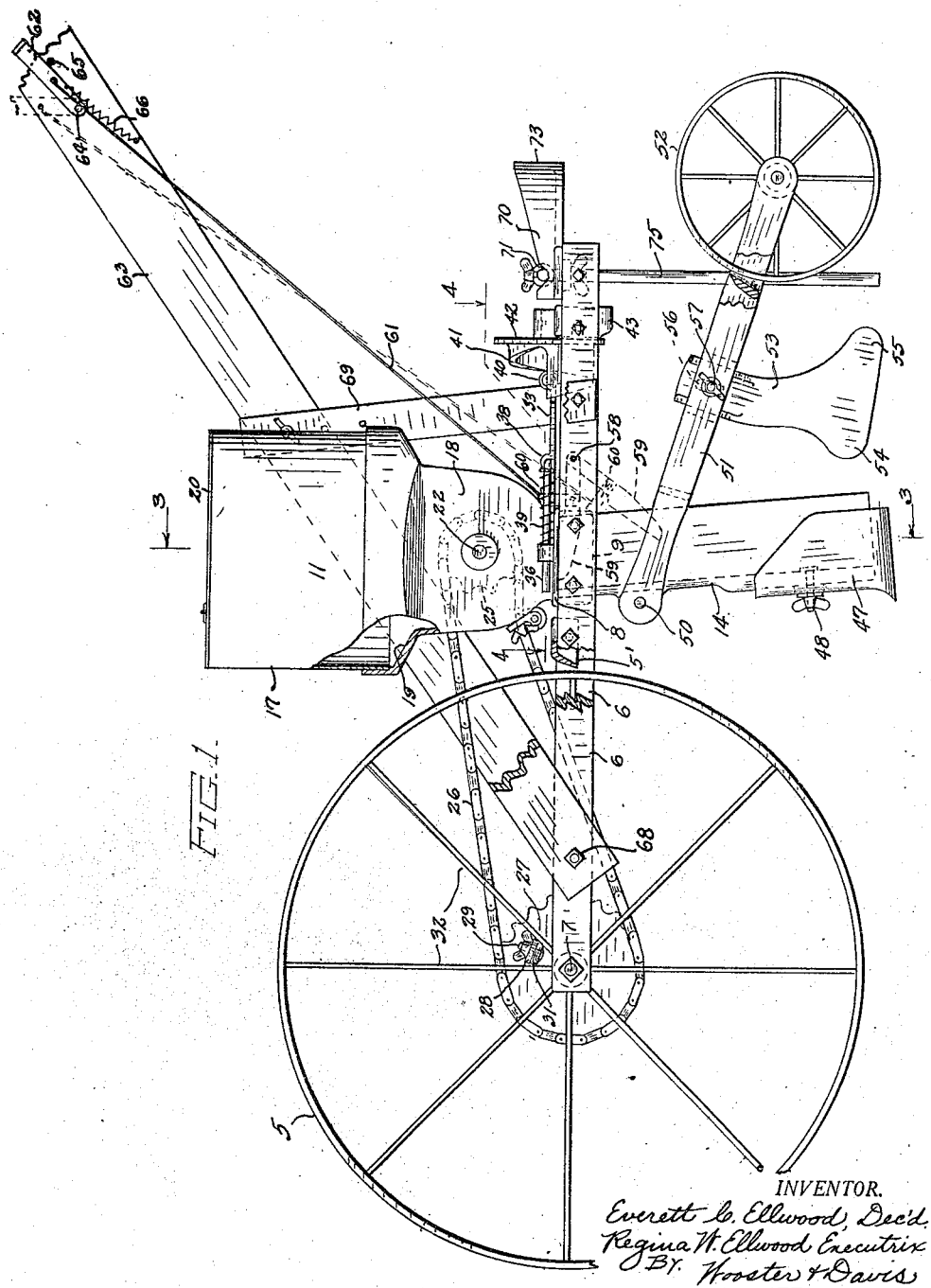
INVENTOR.
Everett C. Ellwood, Dec'd.
Regina W. Ellwood Executrix
BY Wooster & Davis
ATTORNEYS.

May 6, 1924.
E. C. ELLWOOD
SEED DRILL
Filed Oct. 14, 1922
1,492,971
3 Sheets-Sheet 2
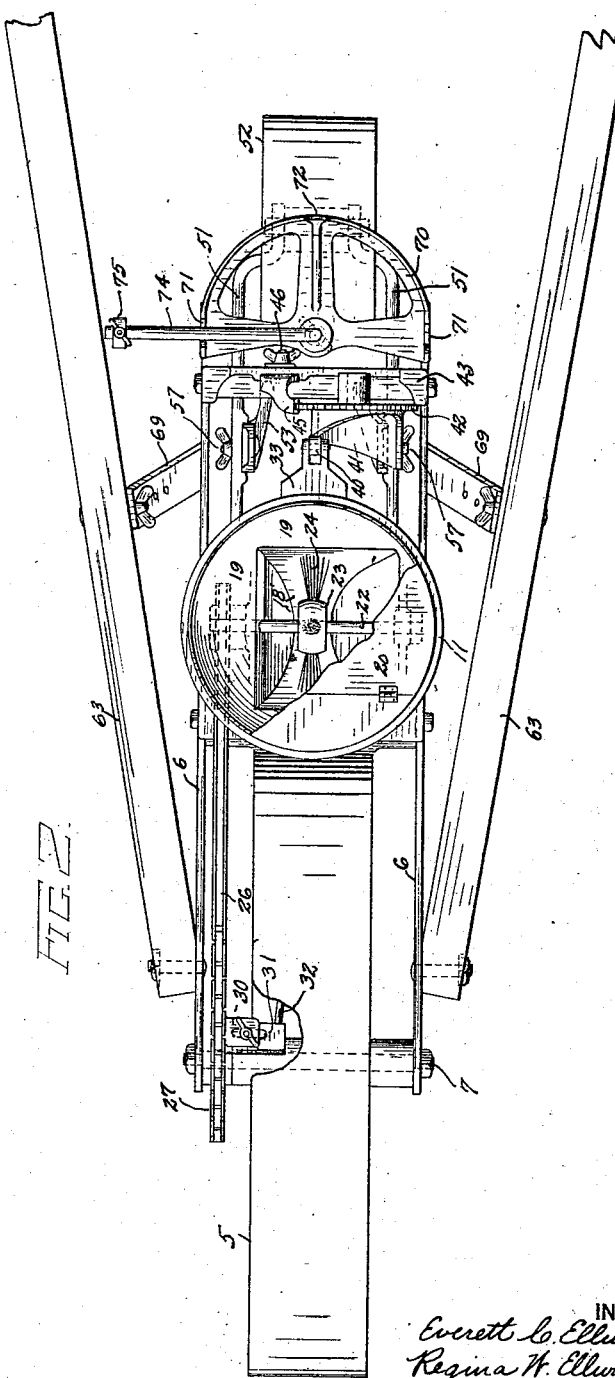
INVENTOR
Everett C. Ellwood, Dec'd
Regina W. Ellwood, Executrix
BY Wooster & Davis
ATTORNEYS May 6, 1924.
E. C. ELLWOOD
1,492,971
SEED DRILL
Filed Oct. 14, 1922
3 Sheets-Sheet 3
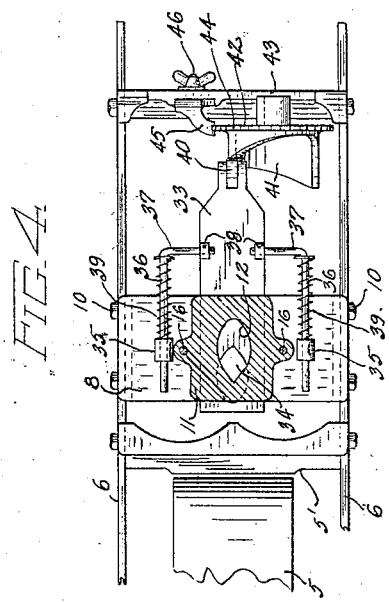
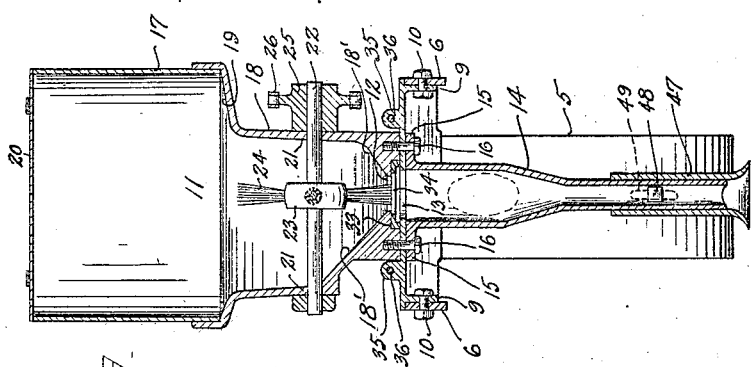
INVENTOR
Everett C. Ellwood, Dec'd.
Regina W. Ellwood, Executrix
BY Wooster & Davis
ATTORNEYS Patented May 6, 1924.

1,492,971

UNITED STATES PATENT OFFICE.

EVERETT C. ELLWOOD, DECEASED, LATE OF WESTPORT, CONNECTICUT; BY REGINA W. ELLWOOD, EXECUTRIX, OF WESTPORT, CONNECTICUT.

SEED DRILL.

Application filed October 14, 1922. Serial No. 594,639.

*To all whom it may concern:*

Be it known that I, REGINA W. ELLWOOD, a citizen of the United States, residing at Westport, in the county of Fairfield and State of Connecticut, am executrix of the last will and testament of EVERETT C. ELLWOOD, late a citizen of the United States, deceased, and that said EVERETT C. ELLWOOD invented a new and useful Seed Drill, of which the following is a specification.

This invention relates to seed drills, and has for an object to provide a seed drill which will be more reliable in operation and of simpler construction than those now generally in use.

It is also an object of the invention to provide an improved drive for the seed discharge mechanism.

It is a further object of the invention to provide an improved device for controlling the rate of feed of the seed.

It is a still further object of the invention to provide an improved means for holding the supply of seed.

Other objects of the invention will become apparent from a detailed description thereof.

For a detailed description of the invention reference is had to the accompanying drawings, in which:

Fig. 1 is a side view of the improved seed drill, parts being broken away to more clearly show the construction.

Fig. 2 is a top plan view thereof.

Fig. 3 is a transverse vertical section substantially on line 3—3 of Fig. 1, and Fig. 4 is a horizontal section substantially on line 4—4 of Fig. 1.

The main support of the machine comprises an iron or other type of wheel 5 mounted to rotate in a frame including longitudinally extending side bars 6, these bars being preferably flat strips of steel, the wheel 5 running on a suitable bolt or shaft 7. Immediately back of the wheel is a suitable scraper 5' to keep the surface of the wheel clean and back of this secured to the side bars 6 and bridging the same is a platform plate 8. This plate preferably rests on the top edges of the side bars and has downwardly projecting walls 9, through which and the side bars may be passed securing bolts 10. Seated upon the top of this plate is a hopper 11, having a seed delivery opening 12 in the bottom thereof, the plate 8 being also provided with an opening 13 therein in alignment with the discharge opening in the hopper. Secured on the under side of this plate beneath the openings 12 and 13 is a seed conductor 14 which preferably has lugs 15 at its upper end, through which pass securing bolts 16 having threaded engagement with suitable lugs on the lower end of the hopper after passing through the plate 8. These bolts, therefore, secure the hopper and seed conductor on opposite sides of the plate. The seed conductor is preferably open at its rear side so that the feed of seed may be observed by the operator.

The hopper comprises two portions, an upper portion 17 and a lower portion 18 with the cross sectional area of the upper portion greater than that of the lower portion, and the two portions are connected by downwardly inclined walls 19 forming shelves intermediate the top and bottom of the hopper. These shelves provide an auxiliary support to sustain a large part of the weight of certain seeds when the hopper is filled to prevent excessive packing and bridging of the seeds in the lower part of the hopper, adjacent the delivery opening so that the feed of seed will be more uniform and also more reliable. The hopper may be of various shapes but the lower part is preferably rectangular in cross section, and the upper portion cylindrical and closed at the upper end thereof by a suitable hinged cover 20. The lower portions of the side walls of the lower section of the hopper are curved inwardly toward the discharge opening 12 as shown at 18' so that all the seed will be deposited at the discharge opening.

On the opposite sides of the lower portion of the hopper are suitable bearings 21 for a cross shaft 22 extending through the hopper, and on which is mounted a disc 23 carrying tufts of bristles 24. Carried by the shaft outside the hopper is a sprocket 25 driven by a chain 26 from a sprocket 27 rotatably mounted on the main wheel shaft 7, and between the hub of this wheel and the adjacent side bar 6. Suitable driving means is provided between the wheel and this sprocket. In the construction illustrated, the sprocket is provided with a lateral lug 28 carrying a bolt having a thumb nut 29 which passes through an elongated slot 30 in a slide 31. This slide is of such a length that it may be projected with its free end between the spokes 32 of the wheel, and, therefore, will form a driving connection between the wheel and sprocket. By loosening the thumb nut the slide may be retracted from the path of movement of the spokes and stop the operation of the agitator within the hopper. As the disc 23 is rotated the bristles will wipe over the seed opening 12 and prevent its becoming clogged.

Between the hopper and the platform plate 8 is a seed slide 33, having an opening 34 therein of substantially the same shape as that in the bottom of the hopper, which openings are oval in shape but comparatively pointed at one end. The pointed end of the opening in the bottom of the hopper is directed forwardly, while the pointed end of the opening in the slide is directed in the opposite direction or rearwardly as it is found this arrangement gives better regulation for the discharge of the seed. The bottom of the hopper is recessed to provide a suitable guide for the slide 33 and on opposite sides of the hopper on the plate 8 are suitable lugs 35 having guide openings therein in which are slidably mounted suitable rods 36. The rear ends 37 of these rods are bent inwardly and project through lugs 38 on seed slide 33, and embracing these rods between the lugs 35 and rear portions 37 are springs 39 tending to move the seed slide outwardly and open the discharge opening in the bottom of the hopper. Mounted on the free end of the seed slide is a roller 40 held against the curved edge of a cylindrical cam 41 by means of springs 39. This cam is attached to an index plate 42 and with this plate is mounted to rotate in a suitable support 43 secured between the side bars 6. The edge of this index disc is provided with a plurality of notches 44 therein which are adapted to receive the edge of an index finger 45 secured to the support 43 by a bolt having a thumb nut 46. By loosening the thumb nut the finger may be loosened and removed from engagement with a notch in the edge of the index plate. This will allow the plate and cam to be rotated to adjust the seed slide 33, and after the proper adjustment has been made tightening of the thumb nut will secure the index finger in position in one of the notches and secure the cam and slide in the proper position desired. Each notch indicates a position for each variety of seed, and the names may be placed on the surface of the plate in any desirable manner.

Mounted on the lower end of the seed conductor 14 is a plow or furrow maker 47 and it is vertically adjustable on the seed conductor by means of a bolt 48 extending through an elongated slot 49 in the plow.

Pivoted to the seed conductor, as indicated at 50, is a roller frame 51 carrying the roller 52, and also carried by this frame between the plow and the roller are the two furrow covering plates 53 which are substantially the shape shown with the front portions 54 of their lower ends spaced apart a greater distance than the rear portions 55 so as to throw the dirt over the seed in the furrow to cover the same, which is later pressed down by the roller 52. The plates 53 are provided with elongated slots 56 through which extend the securing bolts 57 to allow vertical adjustment of these plates.

Pivoted beneath the hopper either to the platform plate 8 or between the side bars 6, as indicated at 58, is a swinging cut off 59, the free end of which is preferably of oval shape and adapted to be swung beneath the opening 34 in the seed slide to close the same and stop the flow of seed when turning corners or at any time when it is not desirable to sow seed. Secured to this cutoff is a short arm 60 to which is connected a rod or wire 61 extending to a position where it is easily accessible to the operator. In the present showing it extends to a small lever 62 pivoted to the machine handle 63 and 64 and is adapted to rest against the stop 65 and be held there against by a spring 66.

The machine is operated by means of a pair of handles 63 secured to the side bars 36 at 68 adjacent the forward ends thereof and by suitable braces 69 at the rear end thereof, these braces being provided with suitable openings 70 to allow vertical adjustment of the handles.

Secured between the side bars 6 adjacent the rear end thereof is a semicircular plate 70 having notches 71 on opposite sides thereof and a notch 72 in the center or rear side. This plate is preferably higher at its center half way between the side bars, as shown at 73 in Fig. 1. The plate is provided with a suitable vertical opening 73 through which loosely extends the downwardly turned end of a marker bar 74 so that this bar may be swung from side to side of the machine to rest and be retained in the notches 71 for marking on opposite sides of the machine. By swinging to the notch 72 this marker will be held in inoperative position. Mounted on the marker or rocker bar is the usual drag 75 for making the marks in the dirt.

The construction described provides a very reliable seed drill which gives a continuous and uniform feed of seed, one which may be easily and quickly set for sowing the proper seed as desired, one which is simple in construction and not easily gotten out of order.

Having thus set forth the nature of the invention, what is claimed is:

1. In a seed drill, a seed hopper having a seed outlet in the lower part thereof and provided with inclined bottom walls to direct the seed to said outlet, said hopper being also provided with downwardly inclined shelves extending inwardly from the side walls thereof intermediate the top and bottom of the hopper and spaced a distance above the inclined bottom walls to form an auxiliary support for the seeds carried in the upper part of the hopper, and means below the level of said shelves for feeding seed from the lower part of the hopper.

2. In a seed drill, a hopper having a discharge opening in the lower part thereof, a slide for controlling said opening, a cylindrical adjusting member rotatable about an axis substantially parallel to the direction of movement of said slide and having a surface at one end thereof engaged by said slide, spring means for holding the slide in engagement with the cam surface, and means for securing the adjusting member in adjusted positions.

In testimony whereof I affix my signature.

REGINA W. ELLWOOD.

*Executrix of the last will and testament of Everett C. Ellwood, deceased.*